May 11, 1926. 1,584,140
M. W. POWELL
AUTOMATIC TWO-WAY BRAKE
Filed Feb. 7, 1925 2 Sheets-Sheet 1
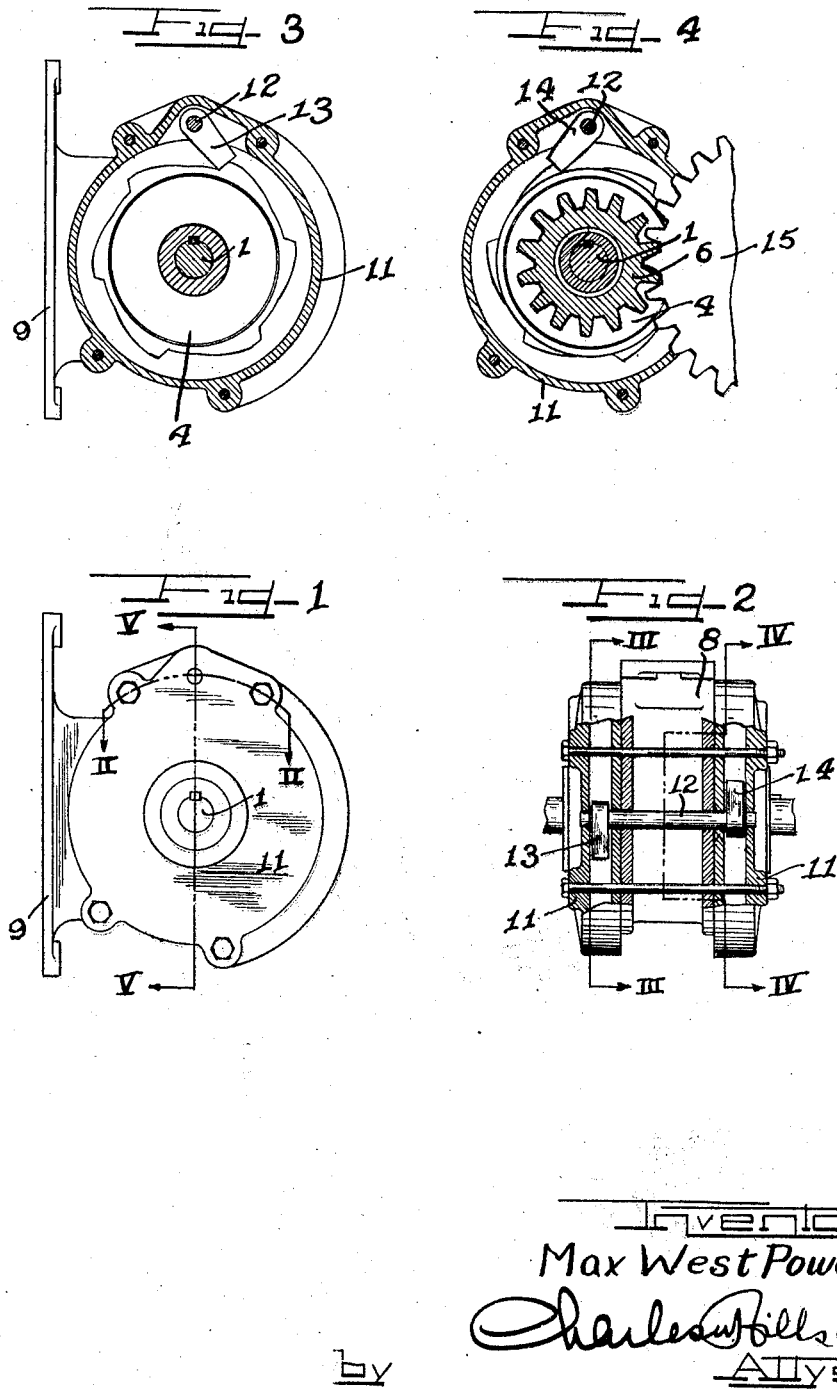
Inventor
Max West Powell
by Charles W. Hills.
Attys

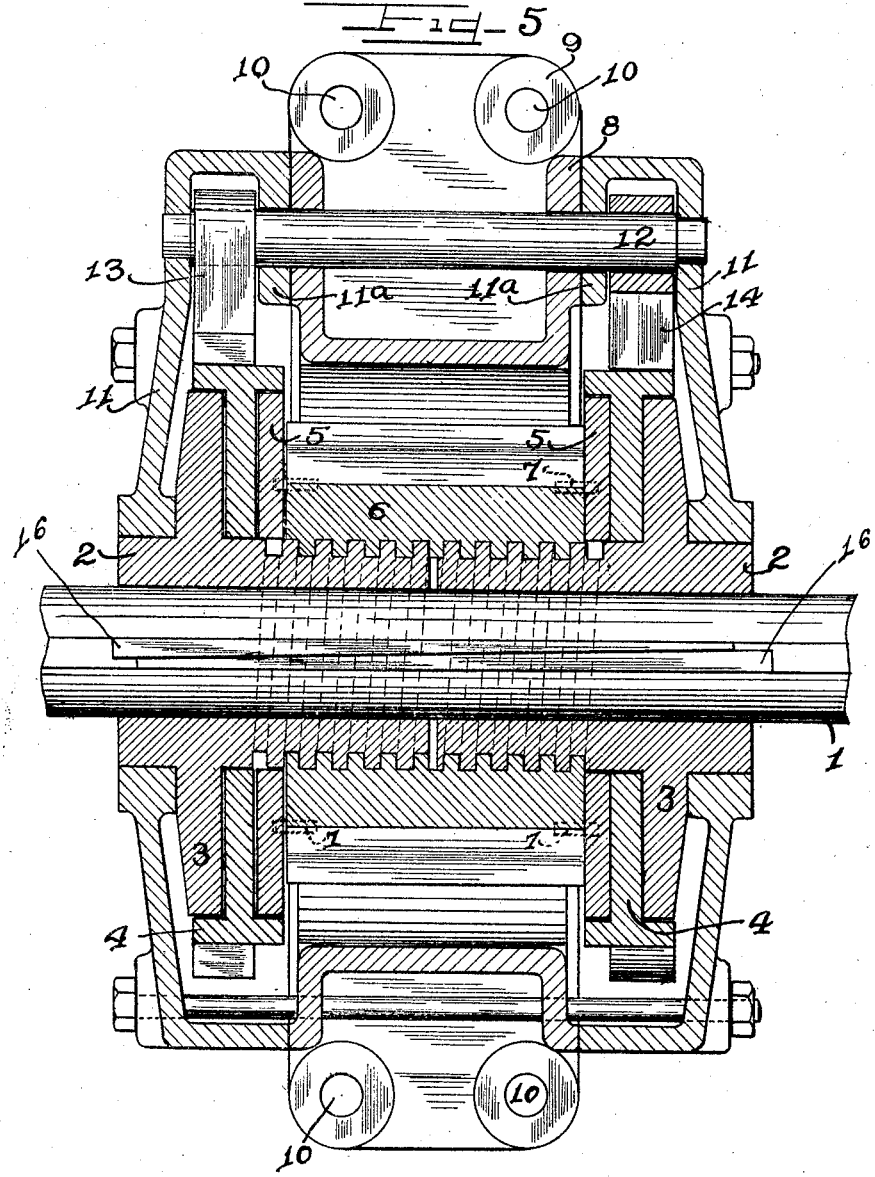

Patented May 11, 1926.

1,584,140

UNITED STATES PATENT OFFICE.

MAX WEST POWELL, OF CHICAGO, ILLINOIS.

AUTOMATIC TWO-WAY BRAKE.

Application filed February 7, 1925. Serial No. 7,494.

This invention relates to a two-way automatic brake especially adapted for hoisting machines, elevators and the like and concerns itself primarily with a structure designed to facilitate the assembling or disassembly thereof.

The invention comprises the novel structure and combinations hereinafter described and more particularly pointed out and defined in the appended claims.

In the accompanying drawings which illustrate a preferred embodiment of this invention and in which similar reference numerals refer to similar features in the different views, Figure 1 is an elevational view of a casing or housing containing this invention.

Figure 2 is a part sectional and part plan view upon the line II—II of Figure 1.

Figure 3 is a sectional view upon the line III—III of Figure 2.

Figure 4 is a sectional view upon the line IV—IV of Figure 2.

Figure 5 is an enlarged sectional view upon the line V—V of Figure 1.

Referring to the drawings which illustrate one embodiment of this invention, there is shown, an intermediate driving shaft 1 having a pair of sleeves 2 keyed thereon by keys 16 which are externally threaded. The threads are preferably of that type known as square threads. Each sleeve has a radial flange 3 spaced a short distance from the outer ends of the threads. A ratchet wheel 4 is loosely mounted upon each sleeve adjacent the flange 3 and against the inner side or web of each ratchet wheel there is loosely mounted a friction disk 5. Each ratchet wheel has a flanged periphery that fits over the flange 3 and disk 5.

A gear 6 is threaded upon the two sleeves 2 and is connected with the two friction disks 5 by dowel pins 7 or the like. The distance between the outer faces of the disks 5 is slightly less than the distance between the inner faces of the ratchet wheels.

A housing encloses the aforementioned structure. This housing comprises a central cylindrical member 8 having an external channel in its surface and a projecting pedestal 9 provided with apertures 10 for receiving attaching bolts or screws whereby the casing may be anchored against movement. End cap members 11 are bolted against the sides of the central housing member 8; the hubs of these end caps fitting upon the sleeves 2 adjacent the radial flanges 3. Opposite portions of the end caps are provided with inwardly extending flanges 11$^a$ which abut the flanges of the channel formed in the central housing 8. These opposite flanged portions of the caps are slightly outwardly offset as shown in Figure 3. A shaft or rod 12 extends through these offset portions of the caps, and oppositely acting pawls 13 and 14 are loosely supported upon said shaft for engagement with the ratchet wheels 4 which are likewise reversely arranged.

In Figure 4, a portion of a driven gear 15 is shown which is driven by the gear 6. Any source of power may be used to drive shaft 1 and the gear 15 may drive a hoisting drum or the like.

In the operation of the heretofore described mechanism, the shaft 1 is rotated by any well known means. And when said shaft is rotating in a clockwise direction when viewing the right hand end in Figure 5, the gear 6 which engages the gear 15 may remain stationary or rotate slower than the shaft 1 and its accompanying sleeves 2 so that there is relative rotation between the gear 6 and sleeves 2. This relative rotation will cause the gear 6 to travel towards the right in Figure 5 until it clamps the right hand friction disk 5 against the web of the right hand ratchet wheel 4, causing the same to rotate conjointly with the sleeve 2. Now if there should be a tendency to rotate the gear 6 in a reverse direction, the pawl 14 will engage its ratchet wheel and prevent such reverse rotation.

If the shaft 1 rotates in an anti-clockwise direction as viewed from the right hand end of Figure 5, the gear 6 will travel toward the left for reasons above explained and clamp the left hand friction disk 5 against the left hand ratchet wheel 4 for conjoint rotation with the shaft 1 and sleeves 2, the other ratchet being released. If the load should tend to cause reverse rotation of the gear 6, it will be prevented by the engagement of the pawl 13 with its ratchet wheel.

It will accordingly be apparent that the ratchet mechanism acts as a double acting brake that prevents reverse rotation irrespective of the rotation of the shaft 1.

In assembling the structure, one of the ratchet wheels is first slipped upon one of the sleeve sections. The gear 6 with its forward friction disk may then be threaded upon said section; the other friction disk may then be applied to the outer end of the gear 6. The other sleeve section 2 with its ratchet wheel thereon may then be screwed into the gear 6. The central housing 8 may then be placed in position and the shaft 12 extended therethrough. The end caps may then be applied by maintaining the pawls in proper position. The housing sections may then be bolted together. This assembling may take place upon the shaft 1 or independent of the shaft 1; in the latter case, the assembled structure needs only be slipped upon such shaft as is obvious, and the spline keys 16 inserted from opposite ends as shown in Figure 5, when the keyways in the sleeves register with the keyways in the shaft 1, the friction disks 5 and ratchet wheels 4 will have the proper freedom or looseness. Thus the registry of the keyways in the shaft and sleeves serves to bring the parts into proper relation.

From the foregoing, it will be apparent that a novel form of structure that serves as a double acting brake has been provided, that is susceptible of being readily assembled as a unitary structure and applied to a shaft, and that is positive, efficient and reliable in its operation.

I am aware that many changes may be made, and numerous details of construction may be varied through a wide range without departing from the principles of this invention, and I therefore do not purpose limiting the patent granted hereon, otherwise than necessitated by the prior art.

I claim:

1. In a double acting brake, a pair of separable, externally threaded sections, each section having a radial flange, a ratchet wheel adjacent each flange, a gear threaded upon said sections, a friction disk adjacent each end of the gear for cooperation with said ratchet wheel, a sectional housing surrounding said ratchet wheels and reversely acting pawls carried by said housing for coaction with said ratchet wheels, said ratchet wheels being reversely arranged.

2. In a double acting brake, a pair of separable, externally threaded sections, each section having a radial flange, reversely arranged ratchet wheels adjacent said flanges, a gear threaded upon said sections, a friction disk at each end of said gear for cooperating with the webs of said ratchet wheels, a stationary housing, and reversely acting pawls carried by said housing for cooperation with said ratchet wheels.

3. In a double acting brake, a pair of separable externally threaded sleeves, each sleeve having a radial flange, reversely acting ratchet wheels loosely positioned adjacent said flanges, a driving member threaded upon said sleeves, a friction member connected to each end of said driving member for cooperation with the web of the adjacent ratchet wheel, reversely acting pawls for cooperation with said ratchet wheels and means for supporting said pawls.

4. In a double acting brake, a pair of threaded sections, a gear threaded upon said sections, ratchet wheels spaced upon said sleeve sections upon opposite sides of said gear, friction disks between said gear and ratchet wheels, a shaft upon which said sleeves are mounted, said shaft and sleeves having keyways, the registry of said keyways serving to properly space said disks and ratchet wheels.

5. In a double acting brake, a power shaft having a keyway, a pair of threaded sleeve sections mounted in opposed relation upon said shafts, said sleeves having radial flanges, ratchet wheels adjacent said radial flanges, friction disks adjacent said ratchet wheels, a gear threaded upon said sections, said sleeves having a keyway adapted to register with the keyway in said shaft for properly positioning the aforementioned parts.

6. In a double acting brake a plurality of threaded sleeve sections, a gear upon said sections, braking means between said gear and sections, a power shaft for supporting said sleeve sections, said power shaft and sleeve sections having keyways adapted to be brought into registry for properly positioning said braking means with respect to said gear.

7. In a double acting brake, a power shaft, a pair of separable sleeve sections splined upon said shaft, a gear threaded upon said sleeve sections, and braking means between each end of said gear and the adjacent sleeve section.

In testimony whereof I have hereunto subscribed my name.

MAX WEST POWELL.